US007689443B2

(12) United States Patent
Pepoon et al.

(10) Patent No.: US 7,689,443 B2
(45) Date of Patent: Mar. 30, 2010

(54) METHODS AND STRUCTURE FOR INSURANCE INDUSTRY WORKFLOW PROCESSING

(75) Inventors: Francesca Miller Pepoon, Lenexa, KS (US); Aruna Babu Kommineni, Shawnee, KS (US); Robert Jack Throop, Lawrence, KS (US); Andrea M. Francisco, Atlanta, GA (US)

(73) Assignee: Employers Reinsurance Corporation, Overland Park, KS (US)

( * ) Notice: Subject to any disclaimer, the term of this patent is extended or adjusted under 35 U.S.C. 154(b) by 1982 days.

(21) Appl. No.: 10/334,883

(22) Filed: Dec. 31, 2002

(65) Prior Publication Data

US 2004/0128182 A1    Jul. 1, 2004

(51) Int. Cl.
*G06Q 40/00* (2006.01)
*G06Q 10/00* (2006.01)

(52) U.S. Cl. .............................................. 705/4; 705/1
(58) Field of Classification Search ....................... 705/4
See application file for complete search history.

(56) References Cited

U.S. PATENT DOCUMENTS

| | | | |
|---|---|---|---|
| 5,768,506 A | 6/1998 | Randell |
| 5,799,297 A | 8/1998 | Goodridge et al. |
| 5,826,020 A | 10/1998 | Randell |
| 5,930,512 A | 7/1999 | Boden et al. |
| 5,950,169 A | 9/1999 | Borghesi et al. |
| 5,991,733 A | 11/1999 | Aleia et al. |
| 6,003,011 A | 12/1999 | Sarin et al. |
| 6,029,144 A | 2/2000 | Barrett et al. |
| 6,078,890 A | 6/2000 | Mangin et al. |
| 6,144,955 A | 11/2000 | Tsuiki et al. |
| 6,282,531 B1 | 8/2001 | Haughton et al. |
| 6,338,093 B1 | 1/2002 | DiRienzo |
| 6,343,275 B1 | 1/2002 | Wong |
| 6,343,310 B1 | 1/2002 | DiRienzo |
| 6,393,456 B1 | 5/2002 | Ambler et al. |
| 6,401,079 B1 | 6/2002 | Kahn et al. |
| 6,415,284 B1 | 7/2002 | D'Souza et al. |
| 6,424,948 B1 | 7/2002 | Dong et al. |
| 2002/0035488 A1* | 3/2002 | Aquila et al. .................. 705/4 |
| 2003/0208384 A1 | 11/2003 | Nelson et al. |

OTHER PUBLICATIONS

Georgakopoulos, An Overview of Workflow Management: From Process Modeling to Workflow Automation Infrastructure, 1995, Distributed and Parallel Databases, 3, 119-153.*

(Continued)

*Primary Examiner*—C. Luke Gilligan
*Assistant Examiner*—Tran Nguyen
(74) *Attorney, Agent, or Firm*—Armstrong Teasdale LLP

(57) ABSTRACT

Methods and structure for automated insurance workflow processing. Methods include receipt of a document to be entered into the workflow processing system. The document is either received initially in digital form or is digitized into a digital form for further processing in the workflow system. Subsequent flow of the document through various review processes of the insurance entity is in electronic form. Interaction with third parties including individual agents, agencies and underwriters may also be conducted in digitized, electronic form. The workflow processes and systems automatically may generate a sequence of tasks to be performed associated with a new document entered in the system and may track progress of the tasks. A central may database maintain information regarding all such tasks and documents.

26 Claims, 11 Drawing Sheets

OTHER PUBLICATIONS

Mingo, ERC Acquires, Reactivates New 'GE CyberComp' Brand, Apr. 9, 2001, Insurance Journal, http://www.insurancejournal.com/magazines/west/2001/04/09/features/17951.htm.*

Anderson, Varied document management techniques can rescue agents awash in paper, Rough Notes v143n12 pp. 106-109, Dec. 2000.*

U.S. Appl. No. 09/833,074, filed Jan. 3, 2002, Freedman, et al.

U.S. Appl. No. 09/993,186, filed Aug. 15, 2002, Hele, et al.

BISYS' Licensing Solutions (web page); www.bisys-licensing.com; Nov. 26, 2002.

CT Insurance Services (web page); www.ctinsuranceadvantage.com; Nov. 26, 2002.

Innovative IT Solutions (web page); www.inovativeit.com; Nov. 26, 2002.

* cited by examiner

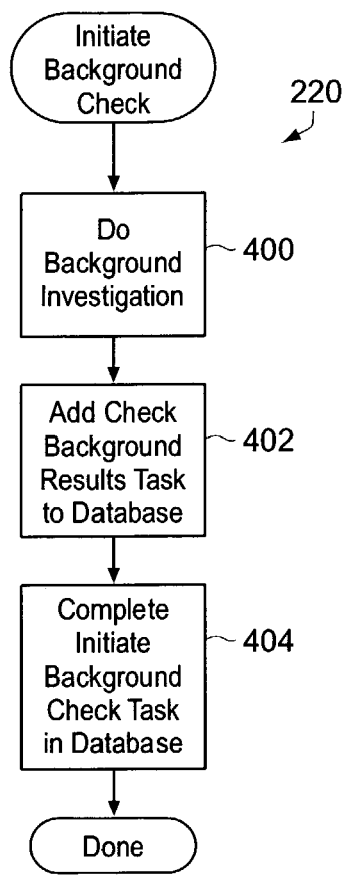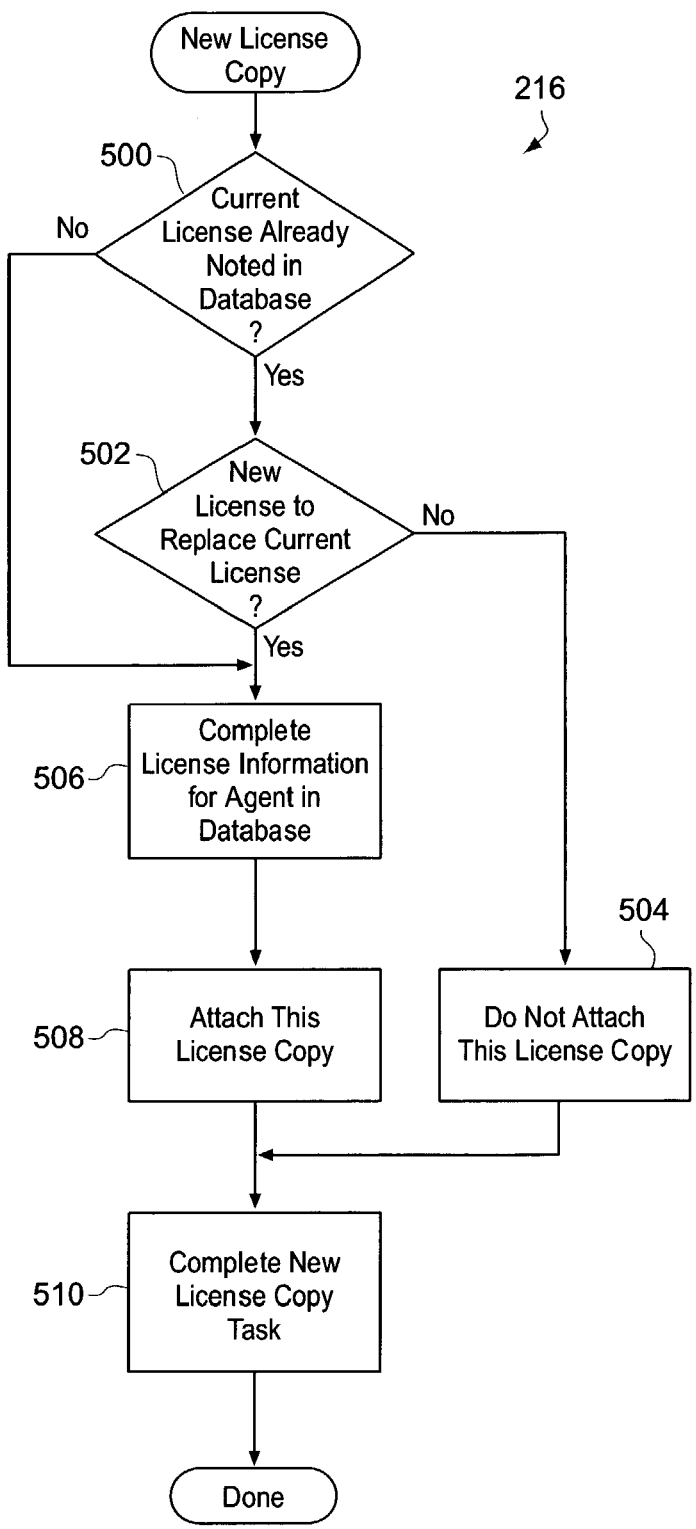

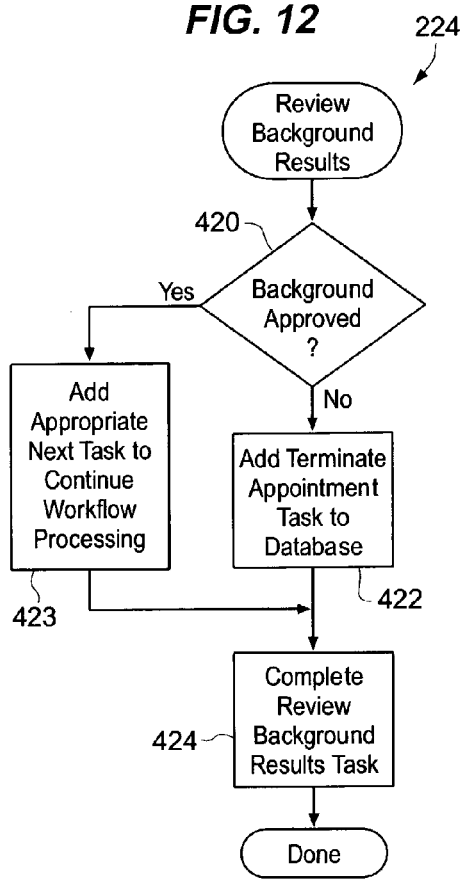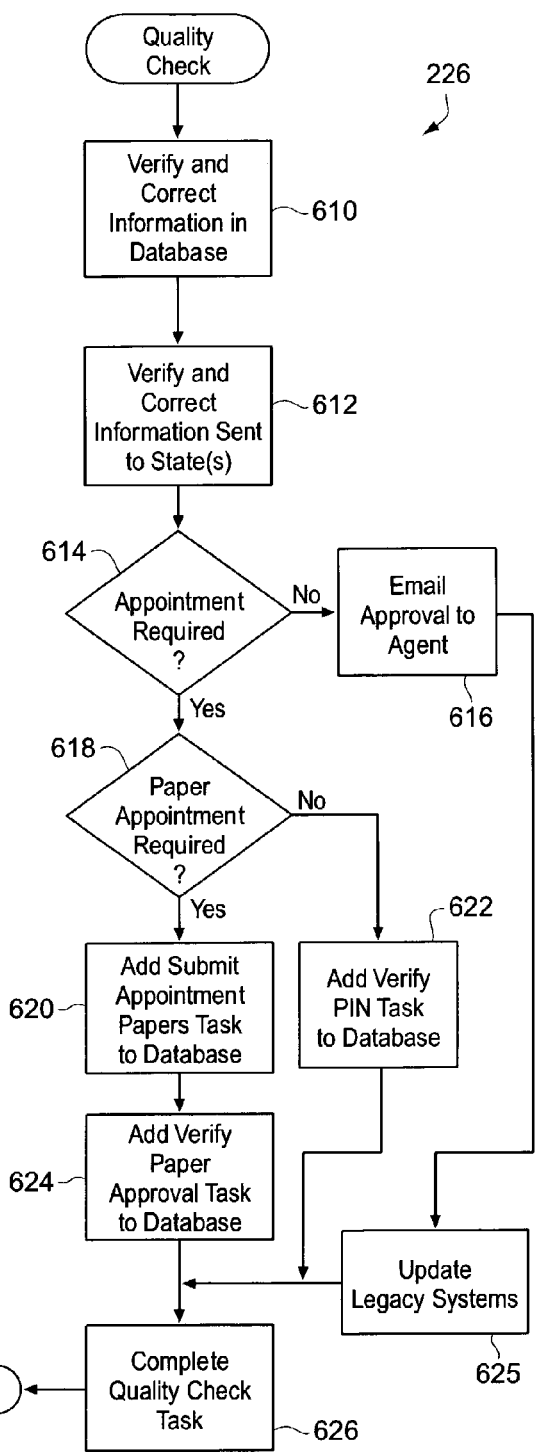

METHODS AND STRUCTURE FOR INSURANCE INDUSTRY WORKFLOW PROCESSING

BACKGROUND OF THE INVENTION

In the insurance industry individual agents or agencies interact with customers to service customer needs and to serve as the interface between the customer and an insurance underwriter. Insurance agents and agencies are legal representatives ("agents" in the legal sense) of one or more insurance underwriters. Insurance underwriters often, in turn, seek reinsurance services of a reinsurance company to help share the costs and risks of catastrophic losses. Insurance underwriting companies are therefore customers (in a sense) of the reinsurance vendors.

As used herein, the term "agent" shall mean individual agents or agencies comprising a number of agents. Further as used herein, "agent" includes brokers and producers associated with insurance agents or agencies. As used herein, "insurance company", "insurer", "insurance organization", "insurance enterprise", "underwriter", and "underwriting company" shall all be used interchangeably as synonyms.

An insurance company may serve a large number of customers through associated agents. Large insurers typically insure customers in a number of states. Each state may impose its own unique regulatory requirements on underwriters doing business in its jurisdiction and/or on agents representing underwriters in that state. These state regulators may have unique regulatory documentation requirements and unique reporting and contact information. In determining whether to accept particular insurance requests from particular customers in particular states through particular agents, (i.e., to make an "appointment"), an insurance company must evaluate a large number of factors including, for example, information regarding the agent and information regarding licensing and regulatory matters within the state in which the underwriter proposes to do business. Often this information must be gathered from a number of diverse sources. Further, this collection of information must be reviewed by a number of different functions within the insurance organization.

Present industry practice typically has the requisite information distributed over a large number sources. Often materials are available only in paper (hard copy) form from a particular source. In other cases, where agents utilize data processing systems for storing such information, a wide variety of data formats and application programs are used by various agents and underwriters. It is common that the data processing systems used by various underwriters and agents are incompatible for the automated exchange of information.

The processes employed by insurance companies at present are therefore principally manual processes that gather data from numerous sources and exchange such information among reviewing entities in paper form—the lowest common denominator of the various formats employed by sources of needed information.

Still further, it is common that various stages of review within an insurance organization will require additional information missing or not supplied from an agent. The manual procedures therefore frequently are stalled awaiting receipt of such additional or missing information. Further, the manual processes presently used by insurance organizations rely on manual forwarding of information from one stage of the process to a next. Such manual processes are slow and error prone. Documents are frequently misplaced or lost in transmission from one stage of the process to a next. Incomplete or missing information imposes delays in the process. Some time later when information is received, the task to enter the data in required documents and resume processing may be missed.

These problems are particularly acute where an insurance organization is requested by a regulatory agency to produce documentation regarding an appointment and the associated licenses and review processes. In present systems, the information may be scattered among a variety of incompatible data processing systems or may only exist in paper form. Documentation of the review processes associated with the appointment may similarly be distributed over a variety of systems and/or paper records. Gather such information at the request of a regulator is therefore a particular problem faced by insurance companies.

It is evident from the above discussion that a need exists for improved workflow tracking and processing in the insurance industry.

SUMMARY OF THE INVENTION

The present invention solves the above and other problems by providing methods and architectures for automated workflow processing in the insurance industry. The invention improves record keeping and processing within insurance companies by centralizing the storage of data pertaining to licensing and appointment. All documents and associated information reviewed in the licensing and appointment process may be retrieved and reviewed from a single source. In addition, records as to who supplied and/or reviewed the information within the insurance organization and when such tasks were completed may be maintained in the same single source in association with the underlying documents. The flexible architecture of the invention allows sequences of cascading tasks to be automatically created to track the workflow of documentation associated with insurance licensing and appointment processes. The particular tasks may be customized to the workflow of a particular insurance company.

In one aspect, a method provides for electronically receiving information from another entity regarding insurance licensing and appointment procedures; reviewing the received information using an automated workflow processing system within the insurance entity; and electronically providing the other entities with required information regarding the insurance licensing and appointment procedures.

In another aspect, a method provides for receiving a document to be reviewed for insurance processing; automatically generating a sequence of tasks to be completed corresponding to processing of the received document; entering information regarding the received document and information regarding the sequence of tasks in a central database; forwarding each task to a select insurance review entity; and automatically updating information in the central database in response to completion of each task.

BRIEF DESCRIPTION OF THE DRAWINGS

FIGS. 3-15 are flowcharts providing additional details of processing of exemplary embodiments of tasks depicted in FIG. 2.

DETAILED DESCRIPTION OF THE INVENTION

Figure 1:
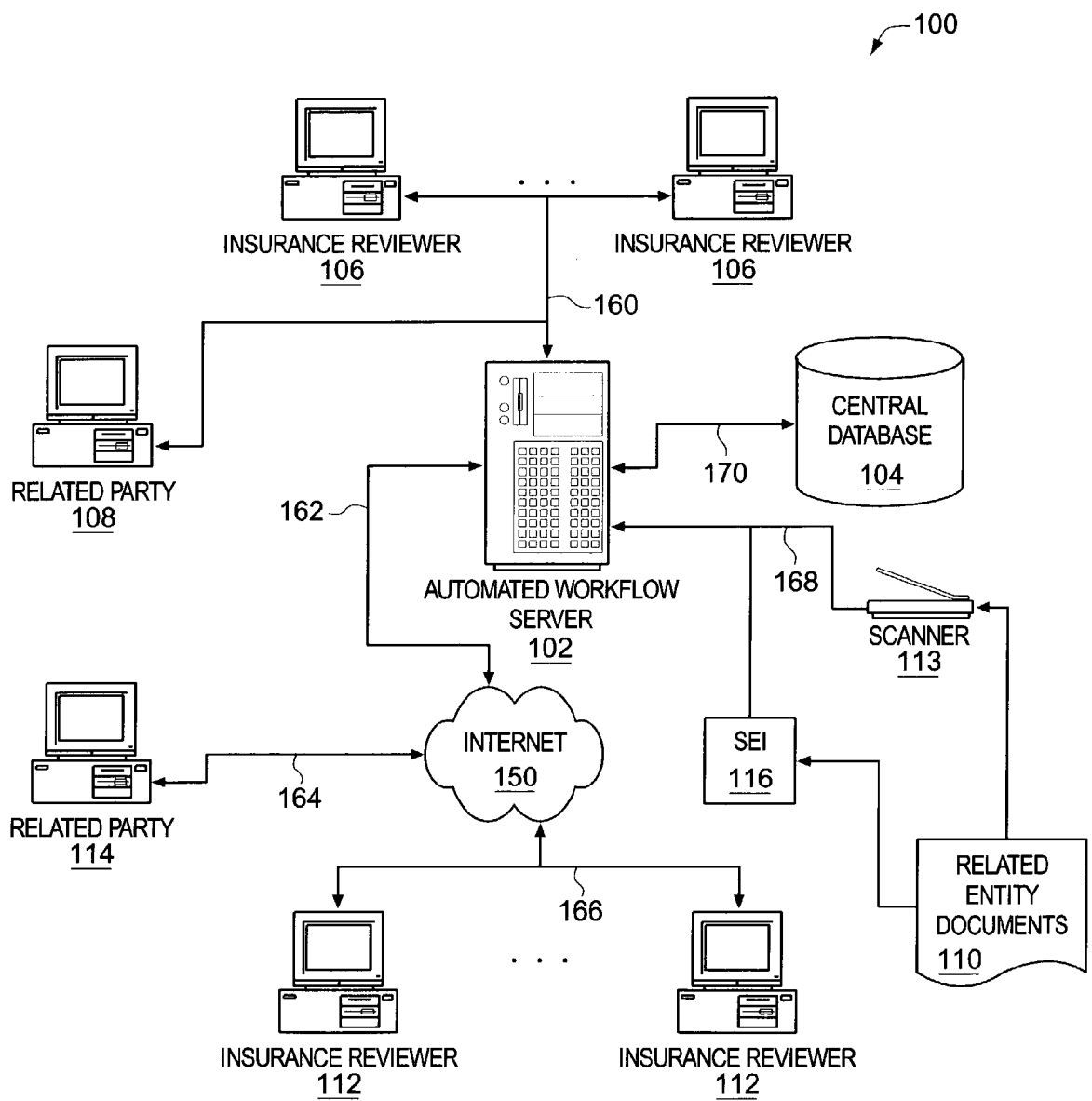
FIG. 1 is a block diagram of an exemplary embodiment of an automated insurance workflow processing system.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram of an exemplary workflow process server environment in which automated workflow processes are performed for insurance document review and processing. Automated workflow server 102 may be coupled with a central database 104 for storing documents, workflow task information and associated information for coordinating and monitoring automated workflow of insurance related documents. A number of processes and tasks discussed herein below may be operable on automated workflow server 102. Those of ordinary skill in the art will recognize that automated workflow server 102 and associated central database 104 may be operable within a single data processing node with associated storage devices or may be distributed over any number of computing and/or storage devices in a distributed processing and/or distributed storage computing environment. Such design choices are well-known to those of ordinary skill in the art.

Automated workflow server 102 may interact with a variety of users through workstations or personal computers coupled to workflow server 102. In particular, a number of insurance reviewing entities 106 may be communicatively coupled with automated workflow server 102 via a local area network 160. In like manner, other insurance reviewers 112 may be physically remote from automated workflow server 102 and therefore may be coupled to the server 102 via Internet 150 and associated communication paths 166 and 162. In like manner, related third parties 108 may be communicatively coupled to automated workflow server 102 through a suitably secured local area network 160 (i.e., using firewalls and/or other security processes and devices). A related party 114 may also be coupled to automated workflow server 102 through the Internet 150 via communication paths 164 and 162. A "related party" as used herein refers to insurance agents, reinsurance organizations and other third parties associated with the insurance company providing the system 100. Through suitable security means, a related party may be allowed direct access to the automated workflow server 102 to enable direct input of data by such related parties and to enable review of information by trusted, secured, related parties. Those of ordinary skill in the art will recognize that any number of related parties and internal insurance reviewers may be coupled to such a computing environment using a wide variety of computer communications techniques and structures. The various communication paths and structures depicted in FIG. 1 are therefore intended merely as representative of a wide variety of similar communication infrastructures well-known to those ordinary skill in the art.

In general, related parties 108 or 114 provide input information ("documents") for the automated workflow processing performed by server 102. Documents are initially entered into the system in any of several forms. In one aspect, documents are initially entered as forms presented on a user's Web client interface. Required information is entered by the user (i.e., a related entity) and validated by the Web client/server programs. Input is generally in the form of insurance documentation associated with licensing requirements for agents and underwriters and/or associated with appointment processes from an underwriter to the related agents. Since the Web client/server processing validates the provided information, the "document" defined by the provided information is entered into the workflow processing database 104. Insurance reviewing entities using workstations 106 or 112 review such documents initially supplied by related parties as provided by the automated workflow processes controlled by server 102.

Related parties may also supply relevant documents in hardcopy form (i.e., paper printouts or facsimile transmission) or as email documents (i.e., email messages and/or related attachment files). These related party documents may be entered into the system using, for example, the systems and methods discussed in co-pending U.S. patent application Ser. No. 10/060,541, entitled "System and Methods for Managing Emails", filed Jan. 30, 2002, an hereby incorporated by reference. These systems and methods (also referred to herein as Systematic Email Induction or "SEI") generally accept documents received by email or facsimile (or other printed documents), automatically extract useful information from such documents and add the extracted information and images of the documents into a document management system. Exemplary of such a document management system is the FileNET system known in the art and described at www.filenet.com. SEI 116 of FIG. 1 is exemplary of such an automated document entry and management capability integrated with the features of the invention to add related party documents 110 into the system.

Such related party documents 110 may also be entered into server 102 by digitizing through scanner 112 and interface pass 168. Well-known optical character recognition (OCR) techniques may be applied to extract textual information from the scanned documents. In this manner, all documents entered into the automated workflow server 102 may be entered in electronic (digitized) form. Other examples of electronic formats may include, for example, text files, other word processing format files, or any other form of information representing a document in an electronic format.

In all cases, digitized documents provided by third parties may be entered into central database 104. Other information pertaining to related parties and information relating to the tasks generated in the automated workflow processes may be generated by server 102 and may be stored in central data database 104 in association with related documents.

Central database 104 may be implemented as any of several well-known indexed file structures and techniques including, for example, hierarchical or relational databases, object-oriented databases, etc. In addition, as noted, commercially available document management systems such as FileNET may be usefully applied to manage such stored, digitized documents.

Automated workflow processing aspects of the invention may include a number of tasks and related processes coordinated and monitored by the workflow processing operable in the server 102. In general, workflow processing aspects of the invention include generation of a number of tasks associated with review processes normally performed by an insurance entity. As noted above, heretofore, such processes were performed manually such that processing was slowed by human interaction in exchanging documents and related information and was often error prone due to human induced errors.

Figure 16:
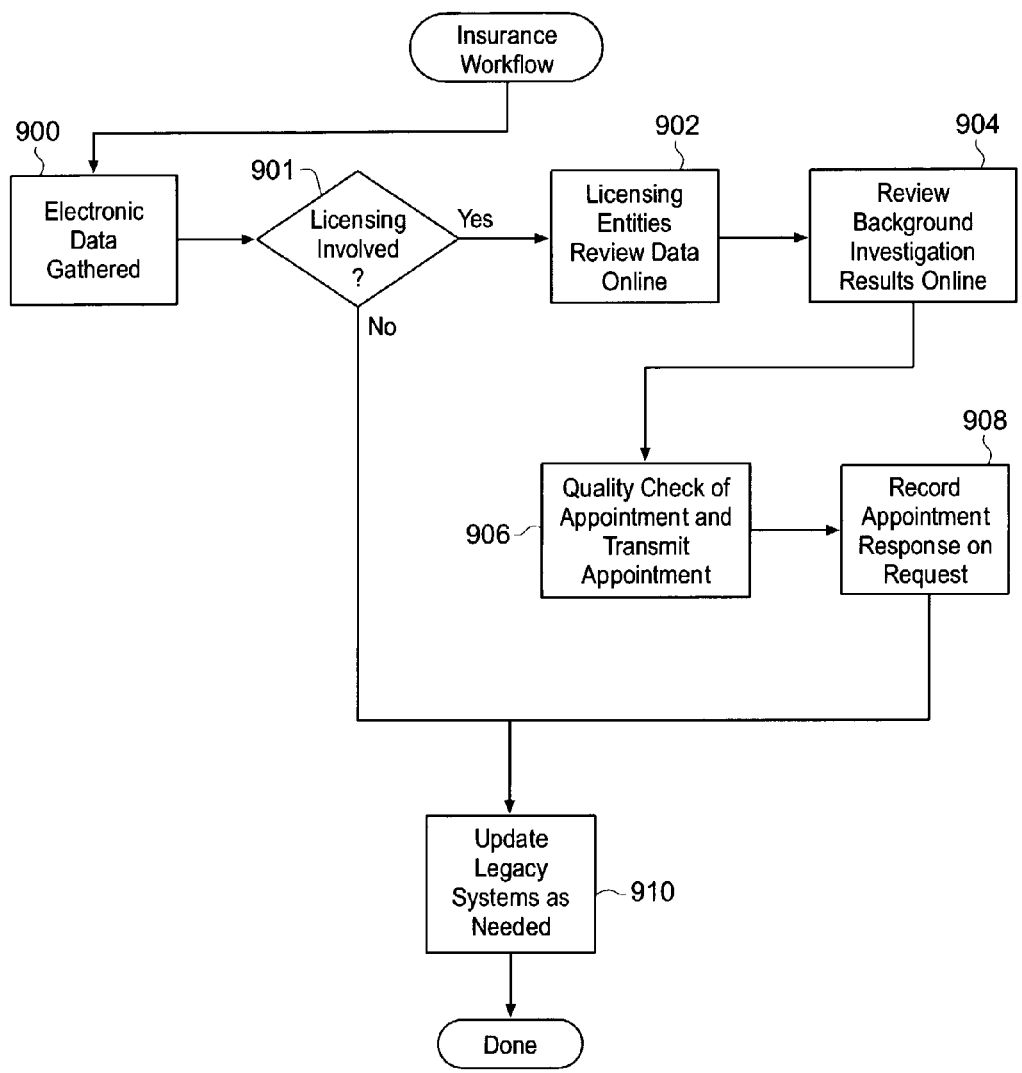
FIG. 16 is a flowchart of a higher level perspective of an exemplary embodiment of an automated insurance workflow process.

The flowchart of FIG. 16 broadly describes an automated workflow processing technique that may be employed in a system 100 such as that of FIG. 1, to automate workflow processing in insurance document management and review. In element 900, documents and related data are gathered in digitized form from input provided in a Web form or converted from other formats (i.e., paper form converted to digitized form by SEI systems, scanning or other means). The documents and related data extracted from the documents are stored in a centralized database so that subsequent review processes may be performed "online" rather than relying on manual processes to exchange information needed for review.

Element 901 determines whether the newly received document involves licensing or appointment related review procedures. If so, processing continues at element 902 as discussed below to initiate tasks relating to licensing and appointment review and approvals. If the received document does not require licensing reviews or involve appointment matters, processing continues at element 910 to update legacy systems as required. As used herein, "legacy systems" refers to older insurance processing systems often maintained within an insurance entity. In view of regulatory and other requirements, insurance companies often maintain older "legacy" systems in place for extended periods of time to generate reports or other forms of required information. Element 910 is therefore operable to maintain the validity of information stored in such legacy systems without need for human interaction.

If element 901 determines that the newly received document requires licensing review and/or appointment related processing, element 902 performs processing to initiate tasks for review of licensing information by a reviewing entity within the insurance organization. The reviewing entity reviews the online data for licensing requirements associated with the insurance industry as regulated in various jurisdictions. The central database may be annotated and updated by this review process to indicate progress of the review process, workflow tasks remaining and information still required to complete the document review process.

Related parties (i.e., agents) may request "appointment" for underwriting of particular matters. A new appointment request from a new agent generally requires the underwriter to perform background checks on the requesting agent. Information obtained from such background checks may be added to the database by element 904 to provide further information for review and approval of appointment requests. Based upon such background information, appointment requests may be granted or refused by the underwriter. When granted, a quality check review process at element 906 may review information maintained online in the database to verify proper correspondence with the requesting agent, with any reinsurance organizations and with insurance regulatory agencies. Various forms of correspondence, including paper and/or electronic, may be required to grant an appointment and to seek regulatory approval for such an appointment. Data maintained in the database enhances the accuracy and hence reliability of such appointment correspondence. At element 908, appointment approval correspondence between regulatory agencies, the insurance company and related parties may be recorded in the database for later retrieval and review. Lastly, as noted above, element 910 represents processing to update any legacy systems in the insurance entity to maintain the validity of information stored in those systems.

Broadly speaking, the workflow process of FIG. 16 may be performed by scheduling a number of tasks to control the sequencing of the review processes, to control the reviewing entities responsible for various reviews and to monitor progress of the various tasks and related reviews. The number of manual steps in such an automated workflow procedure is dramatically reduced as compared to prior processes. Such a reduction in manual intervention improves process speed and reduces errors in the processing of documents through licensing and appointment procedures. All information regarding the agent, licensing and the appointment process will be stored in the database and is thereby accessible by all reviewing entities within the insurance organization as well as related parties through appropriate security devices and processes (i.e., firewalls, etc.).

Figure 2:
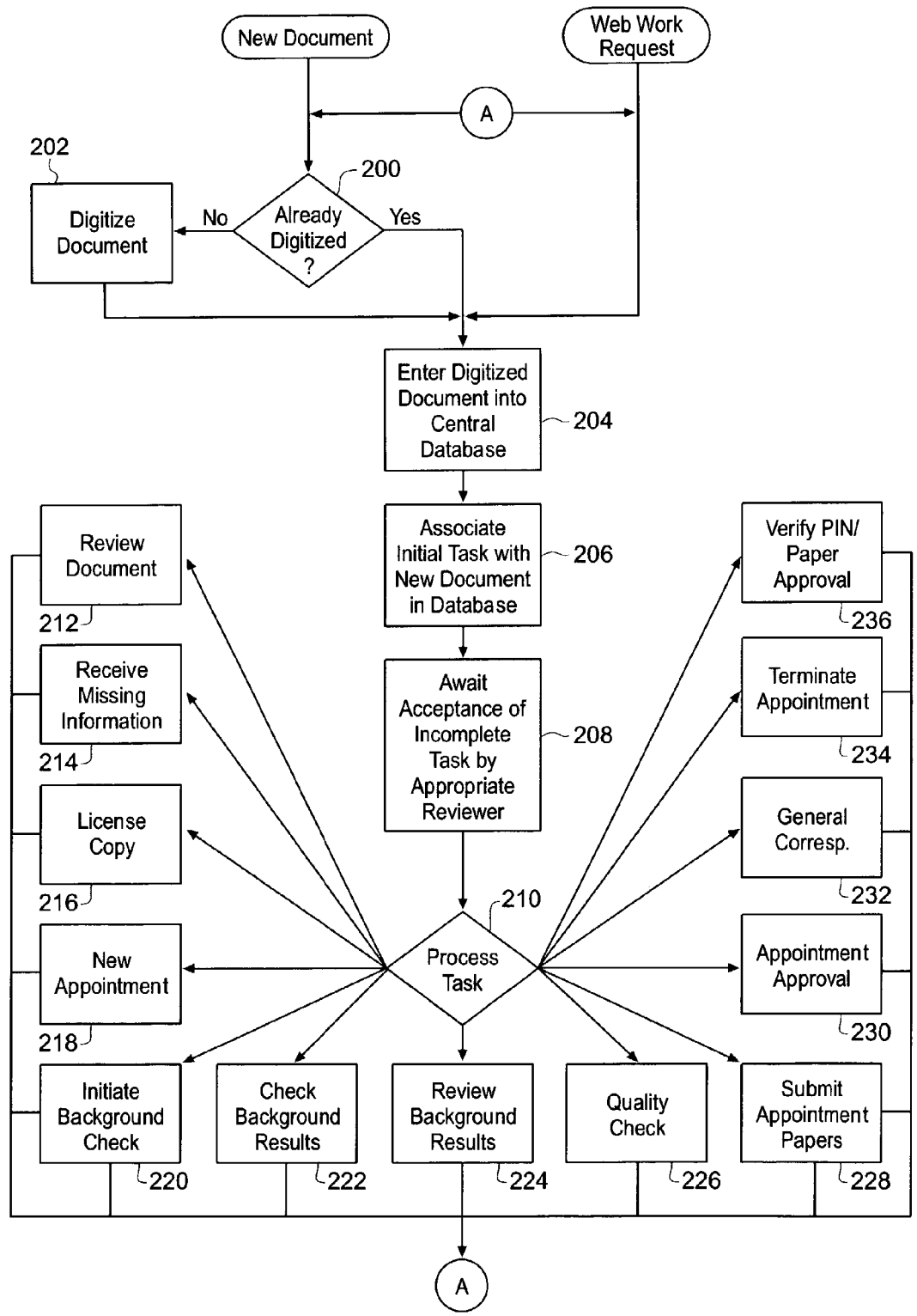
FIG. 2 is a flowchart of an exemplary embodiment of an automated insurance workflow process.

FIG. 2 is a flowchart providing a more detailed disclosure of an exemplary embodiment of an automated workflow process. A number of tasks are generated and monitored by the workflow processing methods based on input of required information to a database and review of the information at various stages to assure continued progress and improved quality.

Automated workflow processing as shown in FIG. 2 may commence with receipt of a new document associated with the insurance process. Typically such new documents are generated and provided by related third parties including, for example, agents, insurance regulatory agencies, etc. Element 200 first determines whether the received document is already in a digitized form. As noted, documents may be directly entered as digitized information in a Web form. If not, element 202 is operable to convert the received document into a digitized form. For example, element 202 may utilize SEI systems and methods as discussed above to create desired digitized documents. Further, element 202 may scan a paper document to create a digitized bitmap representing the received document. Element 202 may then perform well-known optical character recognition ("OCR") techniques to convert such a digitized image into a digitized text format. In general, element 202 may perform any processing necessary to convert a newly received document into an acceptable digitized format useful for automated workflow processing.

Element 204 is then operable to enter the digitized format of the document into the central database. The central database therefore may include document management features as well as general indexed data management features. Regardless of the structure used for central database management, documents and associated information are maintained in various relations within such a central database. As shown, where a new document is received directly in digitized form through Web form input, processing commences with element 204 to store the new document in the database. Entry of data in such a Web form may include validation of the entered data against expected or allowed values.

Upon receipt of such a new, digitized document, element 206 is operable to associate an appropriate initial task with the document. The database may therefore include a queue of tasks awaiting completion. Each task so stored in the database may include reference to an associated document and reference to a related party associated with the document and the task. Where a document is entered by digitizing a paper or email submission as in element 202, a review document task is associated with the newly received digitized document entered in the database. The review document task as discussed further herein below requests review of the digitized information extracted from the new document to verify proper extraction of such information. Where the new document is received as input in a Web form, such a review may be unnecessary because the Web form input processing may have already verified the entered data. Validation techniques associated with Web form input are well known to those of ordinary skill in the art. In such a case, a new license copy task may be associated with the new document as an initial task for processing the document. These and other tasks will be discussed further herein below. The particular tasks associated with a new document may be any tasks appropriate to the desired workflow processing of the insurance entity. The aforementioned review document task and new license copy task are therefore intended merely as exemplary of typical tasks that may be associated with receipt of a new document entered into the workflow processing system.

Element 208 is operable to await acceptance of any incomplete task by an appropriate reviewing entity. In general, each task created by workflow processing may include an attribute indicating the type of reviewing entity responsible for review of the document and associated information. Any number of types of entities may be defined as appropriate for a particular insurance organization. The types of reviewers within an insurer may include, for example: Licensing Reviewers, Appointment Reviewers, Legal Reviewers, Data Entry Reviewers, etc. Numerous additional types and alternative types will be apparent to those of ordinary skill in the art.

While awaiting acceptance of such an incomplete task, other new documents may be received and processed by elements 200 through 206 as described above. As such new tasks are created, the queue of presently incomplete tasks may accumulate new tasks awaiting acceptance by an appropriate reviewing entity as described above for element 208.

In general, all tasks added to the central database may be annotated as "completed" or "incomplete." Appropriate fields in the database associated with the task related records may indicate the present status of each task. Incomplete tasks may be further subdivided into those that are "ready" (i.e., awaiting review) and those that are "pending" (i.e., suspended awaiting some further input or processing by a reviewing entity).

Reviewing entities within the insurance company may gain access to the workflow server through an appropriate secured communication means capable of displaying information from the server and receiving input from the reviewing entity. For example, the workflow server may present information to the reviewing entity and may receive input from the reviewing entity using standard Web based client/server technology. In other words, the workflow server may provide Web service capabilities responsive to Web browsing clients operable on computers used by each reviewing entity. Those of ordinary skill in the art will recognize that a wide variety of standard user interface techniques, including client/server computing structures, may be applied to implement the desired communications between reviewing entities and workflow processing.

When an appropriate reviewer "logs on" to the workflow process, the reviewing entity may indicate acceptance of any of the queued incomplete tasks appropriate for review by that entity. Upon indicating acceptance of such a queued incomplete task, element 210 then determines appropriate task processing for the selected, accepted task. Elements 212 through 236 represent exemplary task processes that may be utilized for automated workflow processing in an insurance enterprise. Those of ordinary skill in the art will recognize a variety of similar tasks to be performed within any particular insurance company. The exemplary tasks depicted in (elements 212 through 236) are discussed further below in conjunction with an associated subsequent figure providing a flowchart with more detailed operation. As shown in FIG. 2, completion of processing of each task may return to the main loop to accept new documents generating further tasks. Further, as will be seen in the discussion of each task process, processing of one task relating to review of a document may generate one or more subsequent tasks relating to workflow of that document. In this manner, the workflow processing generates a sequence of tasks associated with workflow of a newly received document. Each task will be processed by a reviewing entity of the appropriate type.

Element 212 of FIG. 2 represents processing for a review document task. In general, the review document task is the first task associated with receipt of a new document in paper form or as a facsimile. As noted above, this task to review a received document and to review the information contained therein for accurate capture into the database may be obviated where a new document is received as input on a Web browser form. Such a new document entered as fields on a Web form may be validated as a part of the data entry process.

Figure 3:
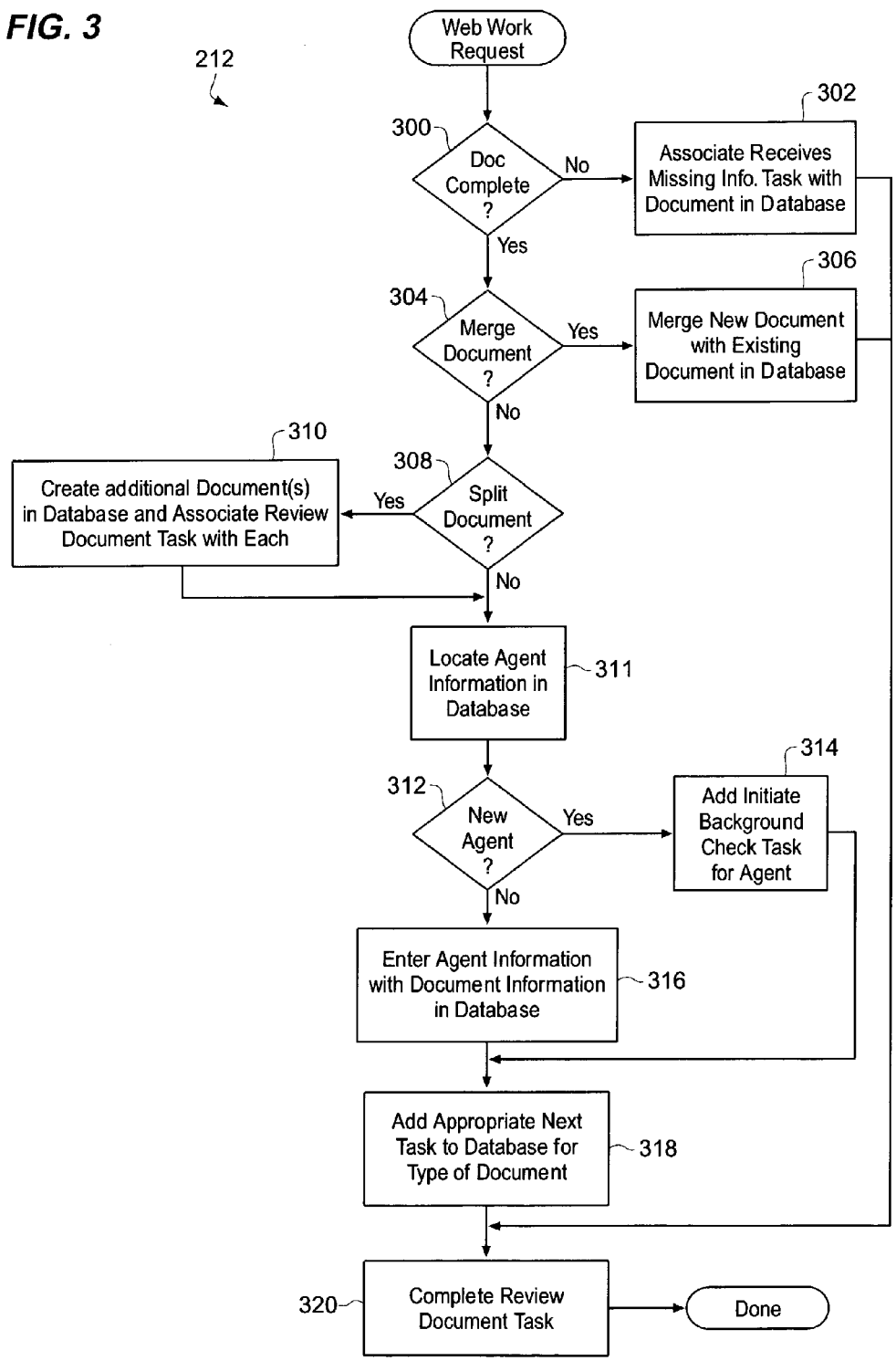

As noted above with respect to element 206, receipt of each new document received in paper or facsimile format by the automated workflow systems initiates at least a review document task associated with the newly received document. FIG. 3 is a flowchart providing additional details of an exemplary review document task process 212. The reviewing entity is first prompted to determine whether the newly received document is complete or incomplete (i.e., all required information present or some information missing). Element 300 therefore receives user input from the reviewing entity indicating whether the document appears to be complete or incomplete. If element 300 determines that the user has indicated that the newly received document is incomplete, element 302 generates a receive missing information task associated with the document in the database. Element 320 then completes the review document task by removing it from the queue of incomplete tasks.

If element 300 determines that the reviewer has indicated that the document appears complete, element 304 is next operable to determine whether the user has identified the document as one to be merged with another existing document. Documents received from related parties (i.e., agents, regulators and reinsurance entities) may be supplemental to other previously received documents. In such a case, information from the newly received supplemental document may be merged with database records and information already associated with the original underlying document previously recorded in the central database. If element 304 determines that the document should be so merged with other documents, element 306 is operable to merge information associated with the newly received document into the database in association with existing information of the previously received related document. As above, element 320 then completes processing of the review document task by removing this task from the queue of incomplete tasks.

If element 304 determines that the newly received document is not to be merged with a previously received document, element 308 is next operable to determine if the newly received document actually represents information corresponding to multiple documents. It is sometimes the case that related parties may submit multiple documents in a batch shipment received in electronic or paper form by the workflow process as a single document. In such a case, the reviewing entity will identify the newly received document as one appropriate to be split into multiple documents. If element 308 determines that the newly received document should be split, element 310 is next operable to create such additional documents in the central database and to associate a review document task with each additional document added to the database. Following creation of such new documents from the split operation of element 310, processing continues with the present document already entered into the database.

Element 311 is next operable in response to the document reviewer entering agent information associated with the document presently under review. Specifically, element 311 is operable to locate information regarding the agent that created and supplied the newly received document. Element 312 is next operable to determine whether element 311 was successful in locating information in the central database regarding the agent supplying the document presently under review. Is no such information is located in the central database, it may be presumed that the agent is a new agent and element 314 is operable to initiate a background check task in the central database for the apparent new agent. Processing of this review document task is then completed by operation of element 320.

If the agent information is located in the database by operation of elements 311 and 312, element 316 is operable to enter the agent information extracted from the document presently under review into the database.

Element 318 is operable to add an appropriate next task to the central database for continued review of the information represented by the document presently under review. Following this initial review to enter the document into the workflow process, numerous other entities within the insurance company will provide other review and input regarding the document and associated licensing and appointment matters. For example, if the newly received document represents only general correspondence, an appropriate task to process such general correspondence is added to the queue of tasks. Element 318 therefore adds a next task (or next tasks) required for further review of the newly entered document by other reviewing entities within the insurance organization.

Lastly, element 320 completes the review document task by removing it from the queue of incomplete tasks to be assigned to reviewing entities.

Figure 9:
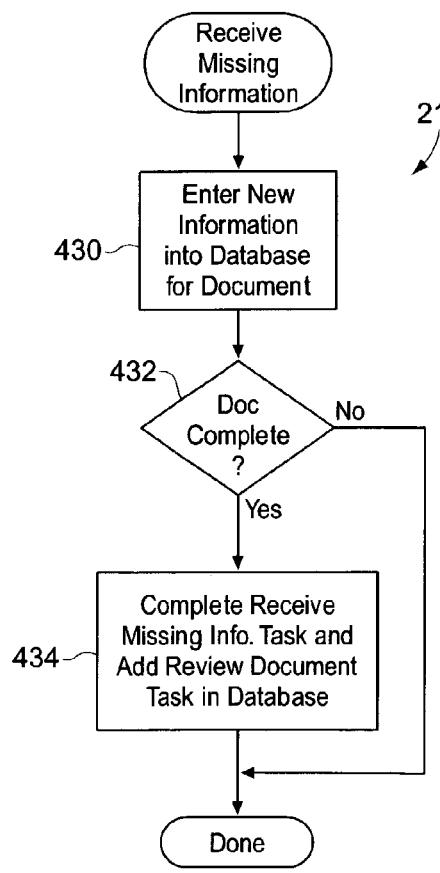

Element 214 of FIG. 2 represents processing of a receive missing information task. Such a task may be generated as noted above with reference to element 302 of FIG. 3. Element 302 of FIG. 3 may generate a missing information task if a received document is deemed to be incomplete or lacking in some respects. FIG. 9 includes a flowchart providing additional details for processing of a received missing information task 214.

In general, a receive missing information task 214 is processed in response to receipt of information deemed to be lacking in a document previously entered in the workflow process by operation of a review document task (element 212 of FIG. 2) as discussed above. In response to receipt of such missing information, element 430 is first operable in response to input from an appropriate reviewing entity to enter new information in the central database associated with a corresponding previously entered document. New information so entered may be derived from supplementary documents received from an associated agent following receipt of the original underlying document. Element 432 then determines whether the document is now complete with respect to required information for further review or whether additional information is still missing. If additional information remains missing, processing of this received missing information task is not completed and the task remains in the queue for further review by an appropriate reviewing entity of the insurance organization upon receipt of additional missing information. If element 432 determines that the underlying document is now complete in the database (i.e., no further information appears to be missing) then element 434 is operable to complete the processing of this received missing information task by removing it from the queue of incomplete tasks. In addition, element 434 adds a review document task to the queue so that the underlying document, with previously missing information now supplied, will be again reviewed by an appropriate reviewing entity within the insurance organization.

Element 216 of FIG. 2 represents processing for a new license copy task. Such a task and may be generated by processing of element 318 of FIG. 3 (as discussed above) in response to receipt of a document representing new licensing information for a particular agent in a particular jurisdiction. A significant number of states require licensing of insurance agents and underwriters doing business within the jurisdiction. The insurance organization doing business with such agents and underwriters in these licensed jurisdictions may record information regarding such licenses for associated agents and underwriters. FIG. 5 is a flowchart providing additional details of the processing of such a new license copy task 216 generated in response to receipt of documents containing new license information. Element 500 is first operable to determine whether current license information is already recorded in the database. If not, processing continues at element 506 as discussed below. If the central database is found to already contain some licensing information regarding the agent identified with the received document, element 502 is next operable to determine whether the new license information represented in the received new license copy is to replace the current license information in the database. If not, element 504 is operable to update database records associated with the received license copy to indicate that this license copy is not to be attached to associated appointments for the corresponding agent. Processing then continues with element 510 to complete processing of this task as discussed below. If element 502 determines that the new license information is intended to replace current license information, element 506 is next operable to complete licensing information for the corresponding agent in the central database in accordance with the newly received license copy. Element 508 is then operable to update the database for records corresponding to this agent so that the newly received license copy will be attached to appointments and other documents relating to the corresponding agent. Element 510 is next operable to complete processing of the new license copy task by removing it from the queue of incomplete tasks.

Figure 6:
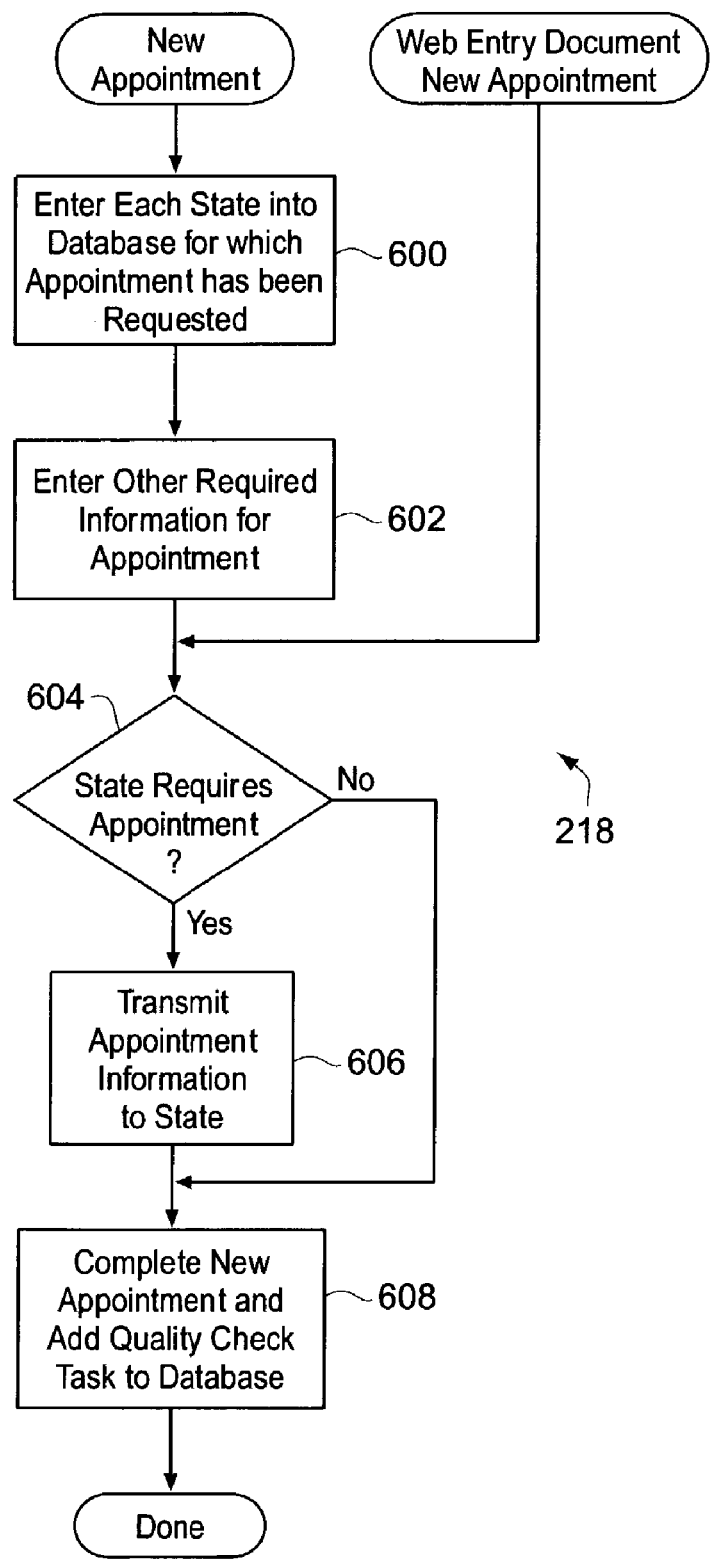

Element 218 of FIG. 2 represents processing corresponding to a new appointment task. A new appointment task may be generated by operation of element 318 of FIG. 3 as discussed above in response to receipt of a new document requesting appointment by a particular agent for a particular insurance matter. FIG. 6 includes a flowchart providing additional details of the operation of processing for a new appointment task 218. Element 600 is first operable to enter information into the central database indicating each state for which an appointment has been requested by the submitting agent. Element 602 is operable to enter other information in the central database required for processing of an appointment request.

As noted in FIG. 6, where a new document is received through the Web form input approach discussed above, the processing of elements 600 and 602 may be bypassed. The Web form used to input a new document may force the user to enter all required information including the states relevant to the licensing and appointment matters. Validated data from such a Web form indicating affected states would thereby be entered in the database to obviate the need to prompt a user to provide a list of affected states. In such a case of a new document entered as a Web form, processing may skip immediately to element 604.

Element 604 is next operable to determine which of the requested states (if any) require submission of appointment requests to state regulatory agencies. If no requested states require submission of appointment information, element 608 is next operable to complete the new appointment task as discussed below. If element 604 determines that any of the requested states require appointment information to be submitted, element 606 is next operable to transmit required appointment information to each state requiring such information. Element 608 is then operable to complete processing of the new appointment task by removing it from the queue of incomplete tasks yet to be assigned to a reviewing entity. Element 608 is further operable to add a quality check task to the queue of incomplete tasks in the database.

Element 220 of FIG. 2 represents processing of an initiate background check task generated by earlier task processing relating to a received document. In particular, an initiate background check task may be added to the queue of incomplete tasks by processing of element 314 of FIG. 3 as discussed above. In general, when a document is received from what appears to be a new agent, the new agent information may be added to the central database and a background check task is added to the queue of incomplete tasks. The background check task is performed by a reviewing entity within the insurance organization to review various aspects of a proposed new agent proposing to transact business with the insurance organization. Such background check processing may include credit and criminal checks and other information appropriate for due diligence in electing to conduct business with a proposed new agent. FIG. 4 includes a flowchart providing additional information regarding processing of such an initiate background check task 220. Element 400 represents all processing required to gather information for the desired background check. Some of the processing of element 400 may be performed automatically through computer interaction and communications between the workflow process server computers and various public information resource computers. Other processing of element 400 may be performed by manual means to obtain desired background information regarding the proposed new agent.

Following the processing of element 400 to obtain background information, element 402 is next operable to add a check background results task to the central database so that further review of the obtained background information may be performed by an appropriate reviewing entity within the insurance organization—i.e., a second review independent of the entity that gathered the information. Element 404 then completes processing of the initiate background check task by removing the task from the queue of incomplete tasks.

Figure 11:
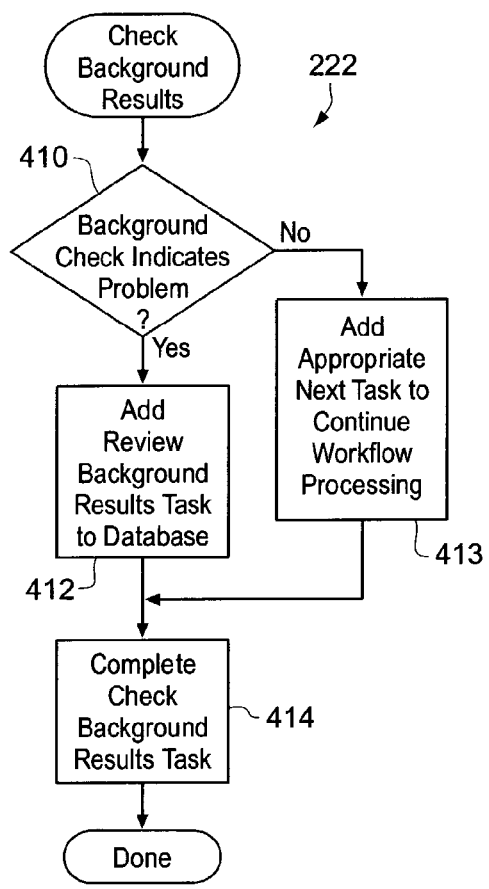

Element 222 represents all processing required to perform a standardized check for receipt of requested background information and to perform a standardized automated verification of the information received. As noted above, such a task may be added to the workflow process by operation of element 402 in FIG. 4 following receipt of desired background information. FIG. 11 is a flowchart providing additional details of the operation of such a task 222. Element 410 therefore represents all processing to quickly identify standard anomalies that may arise in the obtained background information. If no such anomalies are apparent, element 413 is operable to add an appropriate next task to continue processing of the newly received document that initiated the background check. A typical appropriate next task may be, for example, a new appointment task to continue processing of a new appointment request. Element 414 is next operable to complete the review background results task as discussed further below. If element 410 determines that some anomaly exists in the obtained background information, element 412 is next operable to add a review background results task to the central database to provide for yet another level of review within the insurance organization. The quick background check of element 410 may be performed by automated means or by lower level operatives within the insurance organization. Any anomaly that arises from such a quick review may then be passed on to a second level of review within the insurance organization by adding the review background results task as indicated element 412. Element 414 is next operable to complete the check background results task by removing it from the queue of incomplete tasks.

Element 224 of FIG. 2 represents processing of a review background results task to provide a second level of review of background investigation information. Such a task may be generated by element 412 as discussed above when a first level review of background information identifies anomalies in the background information. FIG. 12 includes a flowchart providing additional detail of the operation of element 224 of FIG. 2. Element 420 represents processing of a second level of review growth obtained background information. If the second level reviewer determines that the background information is not problematic, element 423 is operable to add an appropriate next task to continue processing of the newly received document that initiated the background check. A typical appropriate next task may be, for example, a new appointment task to continue processing of a new appointment request. Element 424 is next operable to complete the review background results task as discussed further below. If element 420 determines that the background information indicates a problem with the proposed new agent, element 422 is operable to add a terminate appointments task to the queue so that all further work with the corresponding agent will be terminated by the insurance organization. Element 424 then completes processing of the review background results task by removing it from the queue of incomplete tasks yet to be assigned to a reviewer.

Those of ordinary skill in the art will recognize that the initiation of a background check and the initial verification of received background information may be partially automated. For example, substantial background information may be requested electronically including, for example, credit records, criminal records, etc. In particular, when a new document is entered electronically using a Web form for input of the document information, the Web form data validation functions may initiate any required background check requests automatically through such electronic means. Criminal, motor vehicle and credit records may be requested where the Web form input validation functions determine that the agent identification indicates a new agent. These separate tasks may therefore be obviated in such a case in lieu of an automated process to request and verify background check information.

Element 226 of FIG. 2 represents processing of a quality check task to provide a second review of a new appointment requested and initially granted to a requesting agent. Such a task may be generated by processing of a new appointment request as discussed above with respect to element 608 of FIG. 6. FIG. 13 also provides a flowchart with additional details of the processing of such a quality check task. In general, a quality check task verifies the propriety of a preliminary approval of a requested appointment from an associated agent. A second reviewing entity within the insurance organization reviews the preliminary approval of such an appointment to verify the propriety of submitted documents and to apply insurance underwriting standards for granting of the requested appointment. Element 610 is first operable to verify and, if necessary, correct information recorded in the central database relating to the requested and initially granted appointment. Element 612 is similarly operable to verify and correct information transmitted to various state regulatory agencies that require submission of appointments for approval. If no regulatory approval is required for the requested appointment as determined by element 614, element 616 is next operable to electronically transmit an approval message to the requesting agent. Such electronic approval may be in the form of an e-mail message or other direct electronic exchange information and may be automatically generated and transmitted by the system. Element 625 then updates any legacy systems affected by the granted appointment (for which no regulatory approval was required). Element 626 then completes processing of the quality check task as discussed further below.

If element 614 determines that one or more state regulatory agencies require submission of appointments for approval, element 618 is next operable to determine whether paper approval documents are required by the various states or whether electronic submissions and verifications may be utilized. If element 618 determines that electronic approval request and verifications are adequate, element 622 is next operable to add a verify PIN task to the queue of incomplete tasks in the central database. A PIN as referred to in the verify PIN task is an electronic verification password that allows electronic verification of appointment approval by state regulatory agencies. Element 626 completes processing of the quality check task as discussed further below. If element 618 determines that paper submissions of appointment approvals are required by various states, element 620 is next operable to add a submit appointment papers task to the queue of incomplete tasks in the central database. Element 624 is operable to then add a verify paper approval task to the queue within the database. Element 626 is then operable to complete processing of the quality check task by removing it from the queue of incomplete tasks.

Figure 8:
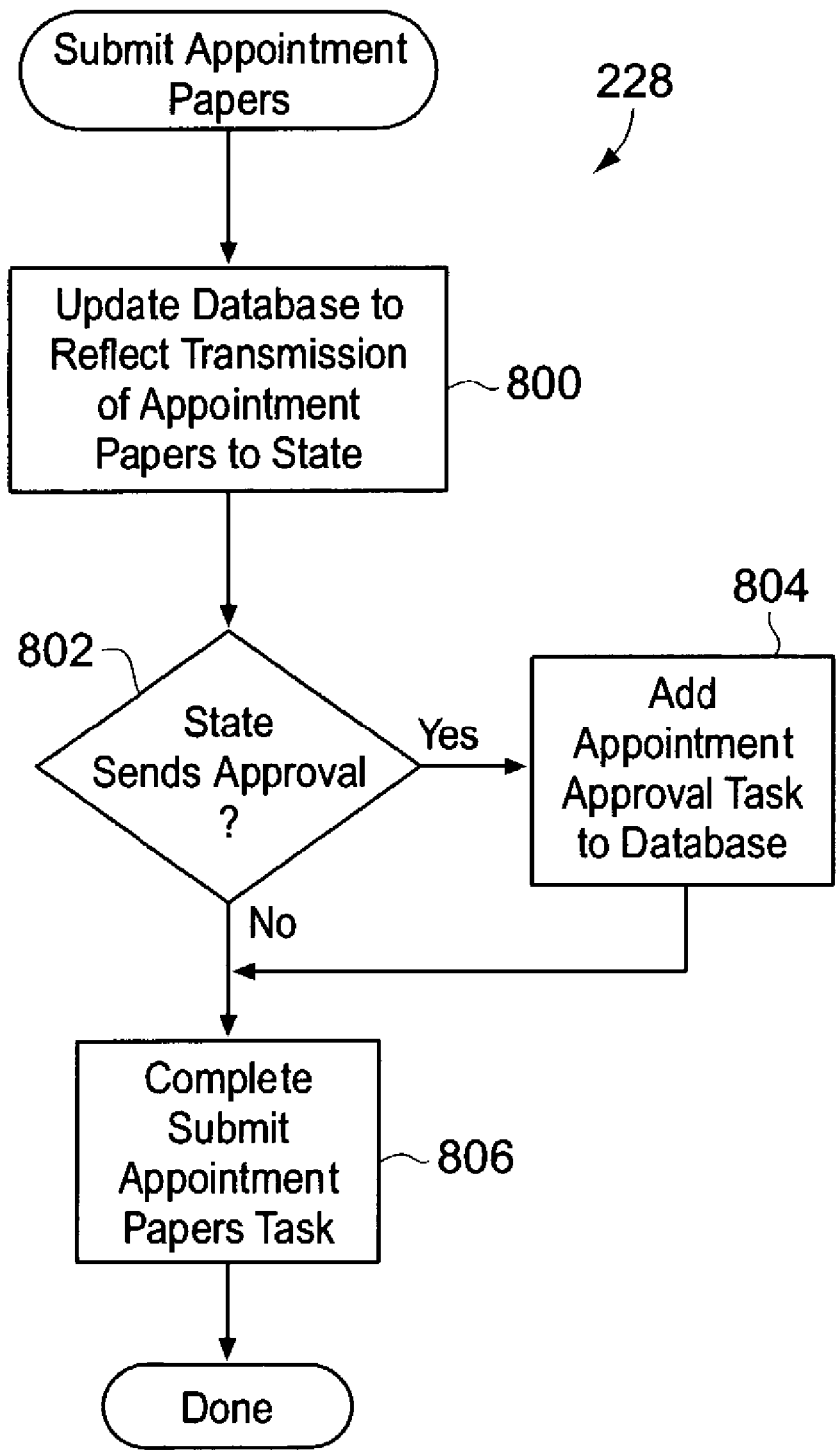

Element 228 of FIG. 2 represents processing of a submit appointment papers task corresponding to the requested new appointment. Where state regulatory agencies require regulatory approval of requested appointments, and where the particular state regulatory agency does not permit electronic submission of such approval requests, this task is operable to generate and transmit required papers associated with the regulatory agencies appointment approval process. Such a task may be generated by element 620 of FIG. 6 in requesting state approval of a proposed new appointment. FIG. 8 includes a flowchart describing additional details of the operation of element 228. Element 800 is first operable to update the central database to reflect a status indicating completed transmission of approval papers relating to appointment in a particular state. Included in processing of element 800 is the generation and transmission of such approval documents as required by various states. Element 802 is next operable to determine whether the various states will respond to the approval request with an approval notification. If so, element 804 adds an appointment approval task to verify expected receipt of such a state approval. In both cases, element 806 is then operable to complete processing of the submit appointment papers task by removing it from the queue of incomplete tasks awaiting assignment to an appropriate reviewing entity.

Figure 14:
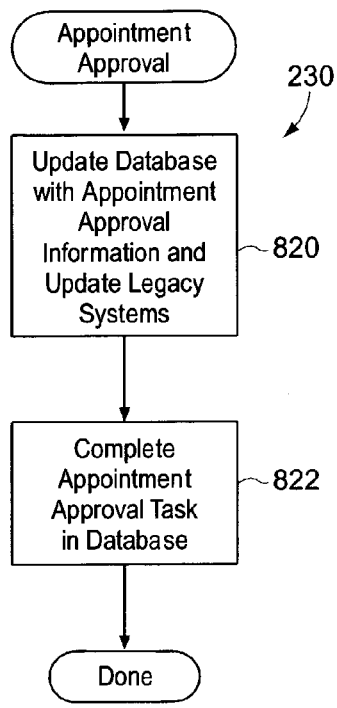

Element 230 of FIG. 2 represents processing of an appointment approval task in conjunction with receipt of approval of a requested appointment from relevant state regulatory agencies. Such an appointment approval task 230 may be generated as noted above by operation of element 804 of FIG. 8. FIG. 14 also provides a flowchart with additional detail of processing for an appointment approval task. Element 820 is operable to update the central database to indicate receipt of the required state approval for the requested appointment. In addition, element 820 is operable to update any legacy systems affected by the appointment approval information Element 822 then completes processing of the appointment approval task by removing it from the queue of incomplete tasks awaiting assignment to an appropriate reviewing entity.

Figure 10:
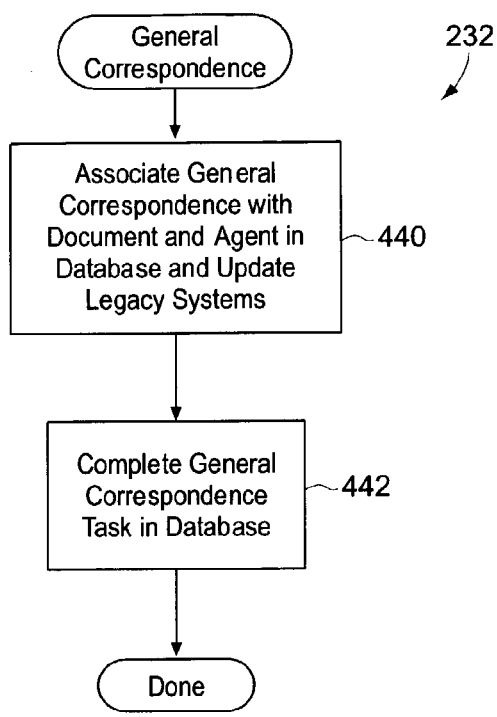

Element 232 of FIG. 2 represents processing of a general correspondence task associated with a particular agent conducting business with the insurance organization. From time to time, general correspondence may be received from such a related party and may be recorded in the central database. Such a task may be generated by element 318 of FIG. 3 in response to receipt of such a general correspondence document from a related party. FIG. 10 provides a flowchart with additional details of the operation to process such a general correspondence task. Element 440 is first operable to associate the general correspondence received with a previously entered document and agent in the central database. Element 440 is also operable to update any legacy systems affected by receipt of such general correspondence from the agent. Element 442 is then operable to complete processing of the general correspondence task in the database by removing the completed task from the queue of incomplete tasks.

Figure 15:
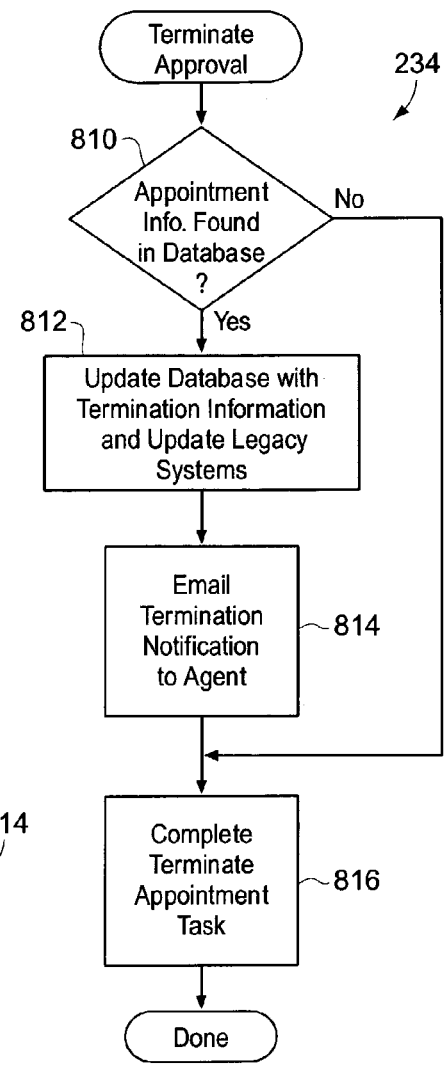

Element 234 of FIG. 2 represents processing of a terminate appointment task associated with a particular agent. Such a task may be generated as discussed above when, for example, problems arise in verification of background information associated with a potential new agent. Such a task may be generated for example by operation of element 422 of FIG. 4. FIG. 15 also provides a flowchart with additional details of the operation to process a terminate appointment task. Element 810 is first operable to determine whether the appointment to be terminated is located in the central database. If not, element 816 is next operable to complete processing of a terminate appointment task as discussed further hearing below. If the appointment to be terminated is successfully located in the central database as determined by element 810, element 812 is next operable to update the central database and any legacy systems with termination information. Such information may include, for example, date of termination of a previously approved appointment or tentatively approved appointment. Element 814 is then operable to send termination notification to associated agents affected by the appointment termination. Element 816 is then operable to complete processing of the terminate appointment task by removing it from the queue of incomplete tasks in the central database.

Figure 7:
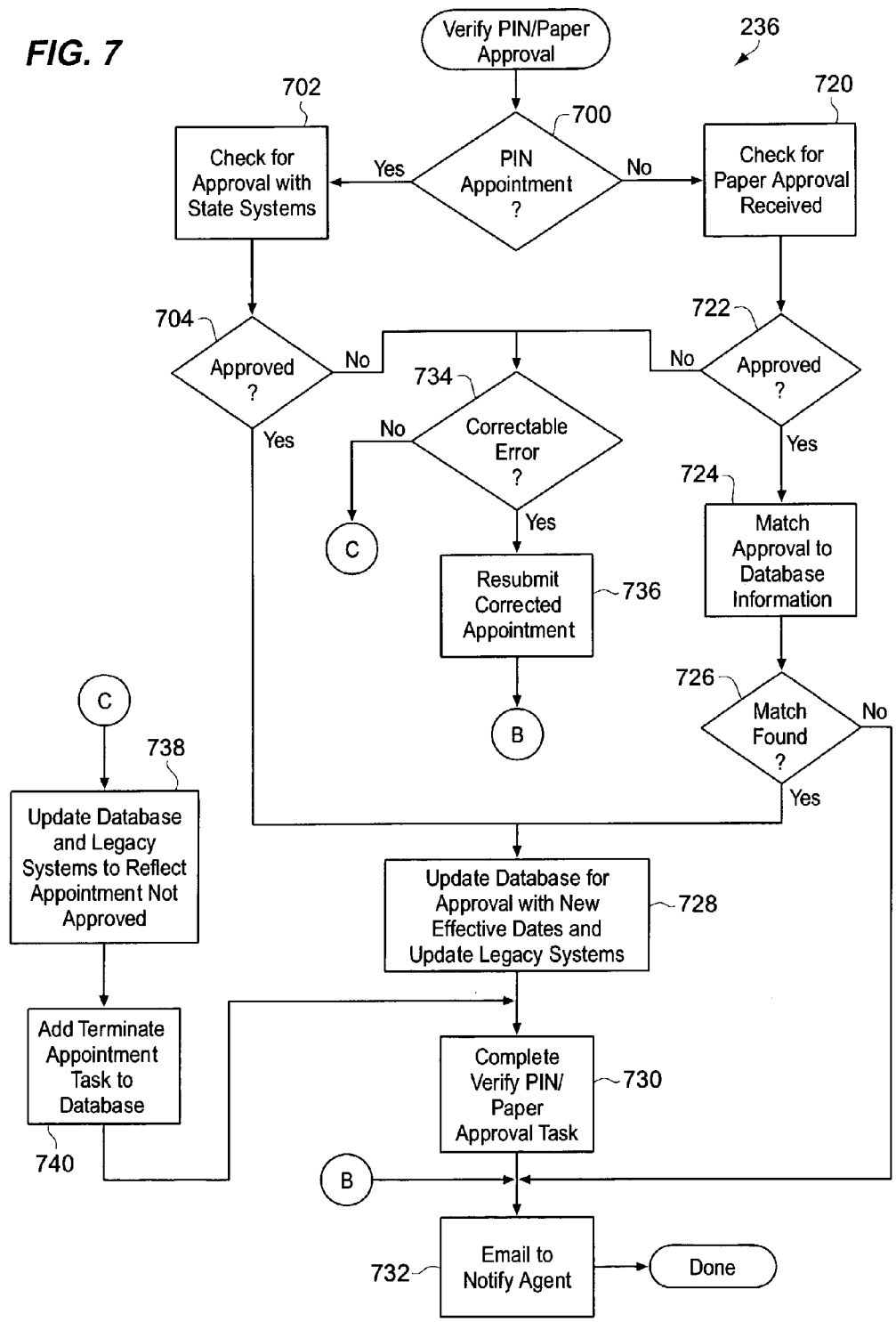

Element 236 of FIG. 2 represents processing of a verify PIN/paper approval task associated with approval processes for a requested appointment. Such a task may be generated, for example, by operation of elements 624 and 622 of FIG. 6. As noted above, the appointment approval process may include requesting and obtaining approval of appropriate state regulatory agencies. This task verifies approval of the requested appointment in either electronic form or in paper form depending upon the capabilities of the particular state regulatory agency. FIG. 7 is a flowchart with additional details of the operation of element 236 to process a verify PIN/paper approval task. Element 700 is first operable to determine whether the approval for the requested appointment is expected from the regulatory agency in electronic form or in paper form. If paper form is expected, element 702 verifies receipt of appropriate approval documents from associated state regulatory agencies. Element 704 then determines whether the approval information indicates an approval of the requested appointment or a denial of the requested appointment. If element 704 indicates that the requested appointment has been approved, processing continues at element 728 as discussed further herein below. If element 704 determines that the requested appointment has been denied, element 734 is next operable to determine whether the denial was based on some correctable error. If so, element 736 is operable to resubmit the request for approval of an appointment with required corrections. Processing then completes at element 732 to notify the agent of the initial denial. Such a notification may be by automatic generation and transmission of an appropriate email message so indicating the initial denial of the appointment. Since the approval request has been resubmitted by operation of element 736, the verify PIN/paper approval task remains pending awaiting receipt of a next approval or denial from associated state regulatory agencies.

If element 734 determines that the denial was not due to correctable error, element 738 is next operable to update the central database and any affected legacy systems to reflect denial of the requested appointment by state regulatory agencies. Element 740 then adds a terminate appointment task to the queue of pending tasks in the central database so as to terminate further business relationships with the disapproved agent. Element 730 then completes processing of the verify PIN/paper approval task by removing it from the queue of incomplete tasks. Element 732 then notifies the associated agent as discussed above.

If element 700 determines that the appointment approval is expected in paper form, element 720 is operable to verify receipt of the expected paper approval of a requested appointment. Element 722 then determines if the paper approval indicates approval or denial of the requested appointment. If element 722 determines that the requested approval is denied, element 734 is next operable as discussed above to attempt correction of correctable errors in the approval submission. If element 722 determines that the paper approval reflects approval of the requested appointment, element 724 is next operable to match the approved appointment with a requested appointment in the central database. Element 726 then determines if the identified appointment was located in the central database. If not, element 732 is operable to notify the associated agent of the status of the corresponding appointment. As noted, such a notification may be by automatic generation and transmission of an appropriate email message so indicating the approval of the requested appointment. If element 726 determines that the requested appointment was located in the central database, element 728 is operable to update the central database and any affected legacy systems to indicate approval of the requested appointment. Elements 730 and 732 are operable as discussed above to complete the verify PIN/paper approval task and notify associated agents.

Those of ordinary skill in the art will recognize that the particular embodiment of workflow processing discussed with respect to FIGS. 2 through 8 are intended merely as representative of one typical workflow process in a typical insurance organization. Numerous equivalent tasks and processes will be readily apparent to those of ordinary skill in the insurance industry and software arts to structure workflow processing as required for the particular unique tasks, documents, reviewing entities and review processes appropriate to a particular insurance organization.

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected

What is claimed is:

1. A method for processing insurance automated workflow using a computer coupled to a database, said method comprising the steps of:

storing a plurality of tasks within the database, each task included within a workflow of insurance processing related matters, each workflow including a sequence of tasks from the plurality of tasks stored within the database;

associating at least one of a plurality of skill-oriented role attributes with each task stored within the database, each skill-oriented role attribute indicating a type of insurance review entity responsible for performing the corresponding task;

receiving an electronic document at the computer for processing, wherein the electronic document includes at least one attachment in a non-graphics image format;

automatically converting, using the computer, the electronic document including the at least one attachment in the non-graphics image format into a single page graphics image format;

automatically generating a first workflow based on the converted electronic document, the generated first workflow including a first sequence of tasks to be completed corresponding to processing of said converted electronic document;

displaying, on the computer, information regarding said converted electronic document and information regarding said first sequence of tasks;

forwarding, using the computer, each task of said first sequence of tasks to a select insurance review entity, wherein the select insurance review entity is selected for each task based on the skill-oriented role attribute associated with the corresponding task; and automatically updating information in the database in response to completion of each task of said first sequence of tasks.

2. The method of claim 1 wherein the step of automatically generating a first workflow includes the step of generating a Review Document Task as a first task of said first sequence of tasks.

3. The method of claim 2 wherein information in the database includes status of each task of said first sequence of tasks and wherein tasks of said first sequence of tasks that follow said first task must await a Completed status to be associated with said first task in the database.

4. The method of claim 3 further comprising the steps of:
receiving acceptance of said Review Document Task by the insurance review entity;
presenting said document on a display for review of said document by the insurance review entity; and
updating the status associated with said Review Document Task in response to input from the insurance review entity.

5. The method of claim 4 wherein the step of automatically updating includes the steps of:
receiving input from the insurance review entity indicating successful completion of said Review Document Task; and
updating the status information associated with said Review Document Task to reflect said Completion status.

6. The method of claim 2 wherein the step of automatically generating a first workflow includes the step of:
receiving input from the insurance review entity indicating completion of the Review Document Task; and
automatically generating a next task in response to said completion.

7. The method of claim 6 wherein the step of automatically generating a first workflow further includes the steps of:
receiving input from the insurance review entity indicating completion of each task of said first sequence of tasks;

automatically generating another task in response to said completion of each task of said first sequence of tasks; and repeating the steps of receiving input indicating completion of each task of said first sequence of tasks and generating said another task until all tasks are completed for processing of said document.

8. The method of claim 1 wherein the step of receiving includes the steps of:

receiving a paper copy of said electronic document; and scanning said paper copy to produce a digitized version thereof.

9. The method of claim 1 wherein the step of receiving includes the steps of:

receiving said electronic document as a facsimile transmission from a facsimile machine; and applying a security filter to verify the transmitting facsimile machine as an authorized source for said electronic document.

10. The method of claim 1 wherein the step of receiving includes the steps of:

receiving said electronic document as an e-mail message from an e-mail sender; and applying a security filter to verify the e-mail sender as an authorized source for said electronic document.

11. The method of claim 1 further comprising the steps of:

whereupon completion of at least one task included within said first sequence of tasks, automatically generating a second sequence of tasks to be completed corresponding to processing of said electronic document;

displaying, on the computer, information regarding said converted electronic document and information regarding said second sequence of tasks;

forwarding each task of said second sequence of tasks to said select insurance review entity; and automatically updating information in the database in response to completion of each task of said second sequence of tasks.

12. The method of claim 1 wherein each task of said first sequence of tasks comprises one of: Review Document Task, New Appointment Task, License Copy Task, Initiate Background Investigation Task, Check Background Results Task, Review Background Results Task, Quality Check Task, Verify PIN Approval Task, Submit Appointment Paperwork Task, Verify Paper Approval Task, and Terminate Appointment Task, and wherein the insurance review entity comprises one or more of Licensing Reviewer, Legal Reviewer and Data Entry Reviewer, and wherein the step of forwarding comprises the steps of:

selecting said select insurance review entity as one having an associated skill-oriented role attribute of Licensing Reviewer for tasks including: Review Document Task, Check Background Results Task, Quality Check Task, Submit Appointment Paperwork Task, and Verify Paper Approval Task;

selecting said select insurance review entity as one having an associated skill-oriented role attribute of Data Entry Reviewer for tasks including: New Appointment Task, License Copy Task, Initiate Background Investigation Task, Verify PIN Approval Task, and Terminate Appointment Task; and selecting said select insurance review entity as one having an associated skill-oriented role attribute of Legal Reviewer for the Review Background Results Task.

13. The method of claim 1 wherein the step of displaying further comprises the steps of:

receiving a request from a first user, the first user included within a first type of insurance review entity, the first type of insurance review entity responsible for performing at least one task included within said first sequence of tasks;

generating a queue of incomplete tasks from said first sequence of tasks associated with the first type of insurance review entity, the queue of incomplete tasks available to all users included within the first type of insurance review entity;

displaying, on the computer, the queue of incomplete tasks associated with the first type of insurance review entity;

receiving an acceptance of at least one incomplete task of the queue of incomplete tasks by the first user; and wherein the step of automatically updating further comprises updating the queue of incomplete tasks to reflect the acceptance of the at least one incomplete task.

14. A computer readable storage medium tangibly embodying program instructions for a method for processing insurance automated workflow, the method performed using a computer, the method comprising the steps of:

storing a plurality of tasks within a database, each task included within a workflow of insurance processing related matters, each workflow including a sequence of tasks from the plurality of tasks stored within the database;

associating at least one of a plurality of skill-oriented role attributes with each task stored within the database, each skill-oriented role attribute indicating a type of insurance review entity responsible for performing the corresponding task;

receiving an electronic document for processing, wherein the electronic document includes at least one attachment in a non-graphics image format;

automatically converting, using the computer, the electronic document including the at least one attachment in the non-graphics image format into a single page graphics image format;

automatically generating a first workflow based on the converted electronic document, the generated first workflow including a first sequence of tasks to be completed corresponding to processing of said converted electronic document;

displaying, on the computer, information regarding said converted electronic document and information regarding said first sequence of tasks;

forwarding each task of said first sequence of tasks to a select insurance review entity, wherein the select insurance review entity is selected for each task based on the skill-oriented role attribute associated with the corresponding task; and automatically updating information in the database in response to completion of each task of said first sequence of tasks.

15. The computer readable storage medium of claim 14 wherein the step of automatically generating a first workflow includes the step of generating a Review Document Task as a first task of said first sequence of tasks.

16. The computer readable storage medium of claim 15 wherein information in the database includes status of each task of said first sequence of tasks and wherein tasks of said first sequence of tasks that follow said first task must await a Completed status to be associated with said first task in the database.

17. The computer readable storage medium of claim 16 further comprising the steps of:
receiving acceptance of said Review Document Task by the insurance review entity;
presenting said document on a display for review of said document by the insurance review entity; and
updating the status associated with said Review Document Task in response to input from the insurance review entity.

18. The computer readable storage medium of claim 17 wherein the step of automatically updating includes the steps of:
receiving input from the insurance review entity indicating successful completion of said Review Document Task; and
updating the status information associated with said Review Document Task to reflect said Completion status.

19. The computer readable storage medium of claim 15 wherein the step of generating a first workflow includes the step of:
receiving input from the insurance review entity indicating completion of the Review Document Task; and
automatically generating a next task in response to said completion.

20. The computer readable storage medium of claim 19 wherein the step of generating a first workflow further includes the steps of:
receiving input from the insurance review entity indicating completion of each task;
automatically generating another task in response to said completion of each task of said first sequence of tasks; and
repeating the steps of receiving input indicating completion of each task of said first sequence of tasks and generating said another task until all tasks are completed for processing of said document.

21. The computer readable storage medium of claim 14 wherein the step of receiving includes the steps of:
receiving a paper copy of said electronic document; and
scanning said paper copy to produce a digitized version thereof.

22. The computer readable storage medium of claim 14 wherein the step of receiving includes the steps of:
receiving said electronic document as a facsimile transmission from a facsimile machine; and
applying a security filter to verify the transmitting facsimile machine as an authorized source for said electronic document.

23. The computer readable storage medium of claim 14 wherein the step of receiving includes the steps of:
receiving said electronic document as an e-mail message from an e-mail sender; and
applying a security filter to verify the e-mail sender as an authorized source for said electronic document.

24. The computer readable storage medium of claim 14 further comprising the steps of:
whereupon completion of at least one task included within said first sequence of tasks, automatically generating a second sequence of tasks to be completed corresponding to processing of said electronic document;
displaying, on the computer, information regarding said converted electronic document and information regarding said second sequence of tasks;
forwarding each task of said second sequence of tasks to said select insurance review entity; and
automatically updating information in the database in response to completion of each task of said second sequence of tasks.

25. The computer readable storage medium of claim 14 wherein each task of said first sequence of tasks comprises one of: Review Document Task, New Appointment Task, License Copy Task, Initiate Background Investigation Task, Check Background Results Task, Review Background Results Task, Quality Check Task, Verify PIN Approval Task, Submit Appointment Paperwork Task, Verify Paper Approval Task, and Terminate Appointment Task, and
wherein the insurance review entity comprises one or more of Licensing Reviewer, Legal Reviewer and Data Entry Reviewer, and
wherein the step of forwarding comprises the steps of:
selecting said select insurance review entity as one having an associated skill-oriented role attribute of Licensing Reviewer for tasks including: Review Document Task, Check Background Results Task, Quality Check Task, Submit Appointment Paperwork Task, and Verify Paper Approval Task;
selecting said select insurance review entity as one having an associated skill-oriented role attribute of Data Entry Reviewer for tasks including: New Appointment Task, License Copy Task, Initiate Background Investigation Task, Verify PIN Approval Task, and Terminate Appointment Task; and
selecting said select insurance review entity as one having an associated skill-oriented role attribute of Legal Reviewer for the Review Background Results Task.

26. A method of processing insurance workflow, said method comprising:
(a) identifying a plurality of insurance workflows;
(b) identifying a plurality of tasks;
(c) for each workflow in step (a), associating one or more tasks in step (b) with the workflow in a computer;
(d) receiving an electronic document at the computer, wherein the electronic document comprises at least one attachment in a non-graphics image format;
(e) using the computer, automatically converting the attachment in an non-graphics image format into a single page graphics image format;
(f) using the computer, analyzing the converted attachment in the single page graphics image format to determine one or more insurance workflows associated with the converted attachment;
(g) using the computer, determining the one or more tasks associated with the converted attachment based on the results of step (f); and
(h) forwarding the one or more tasks associated with the converted attachment to a select insurance review entity for workflow processing.

* * * * *